UNITED STATES PATENT OFFICE.

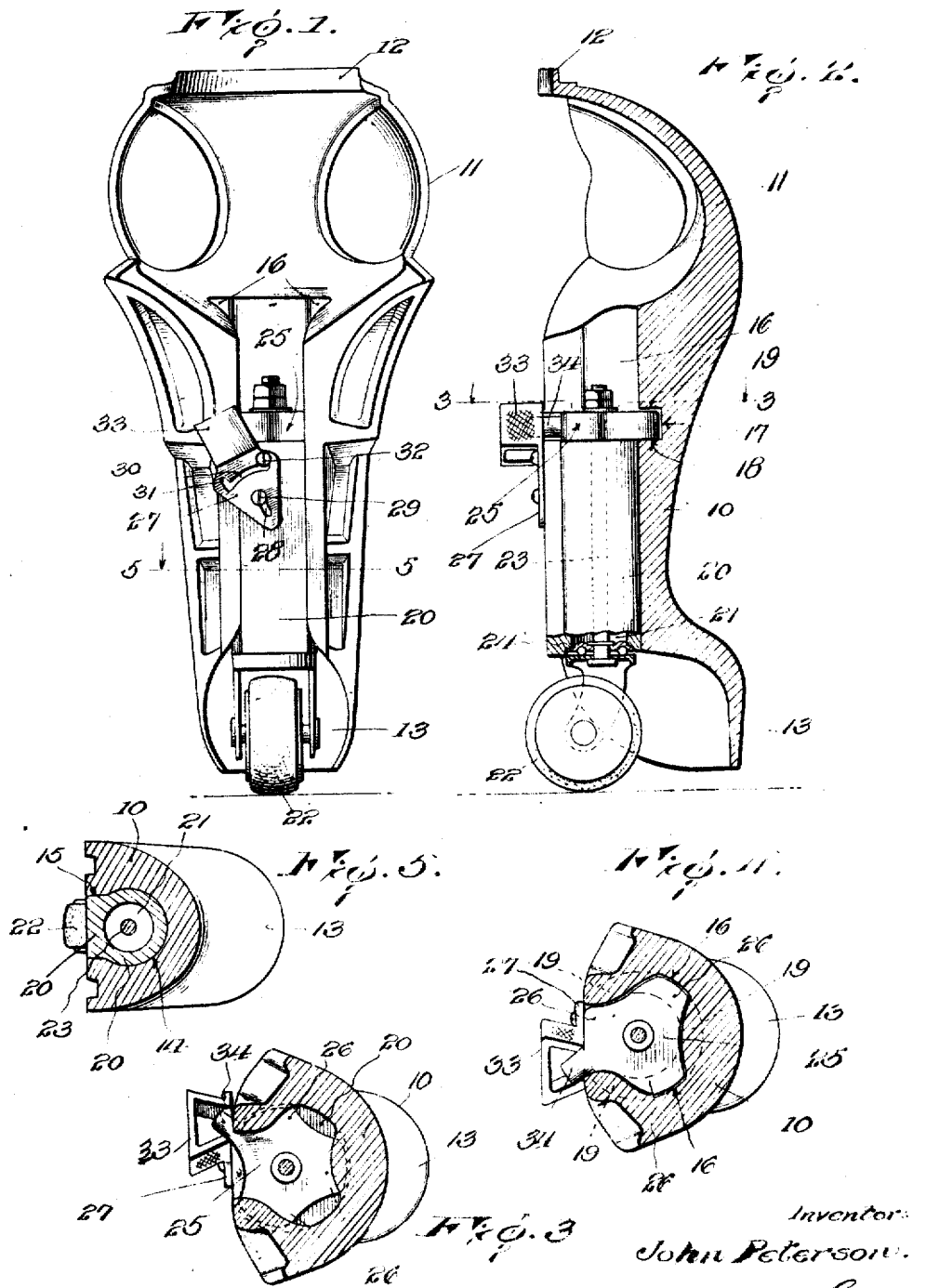

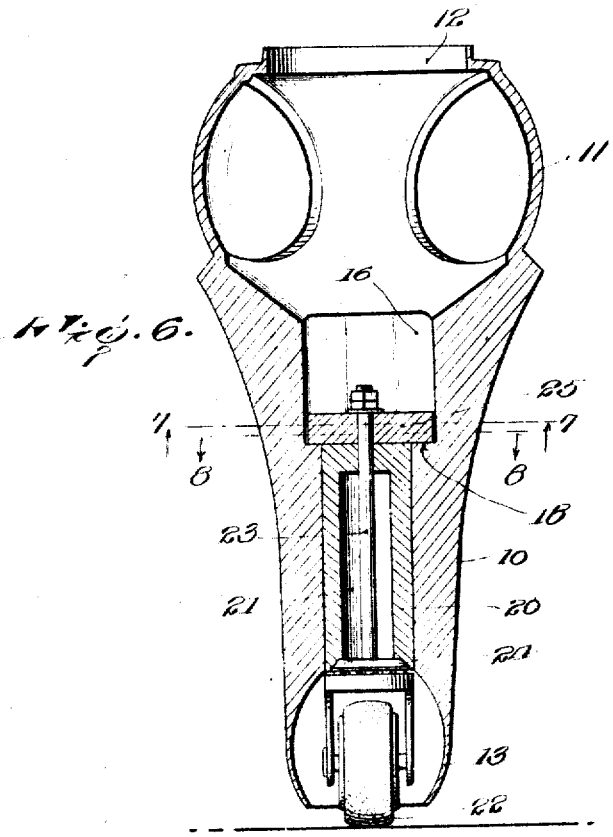
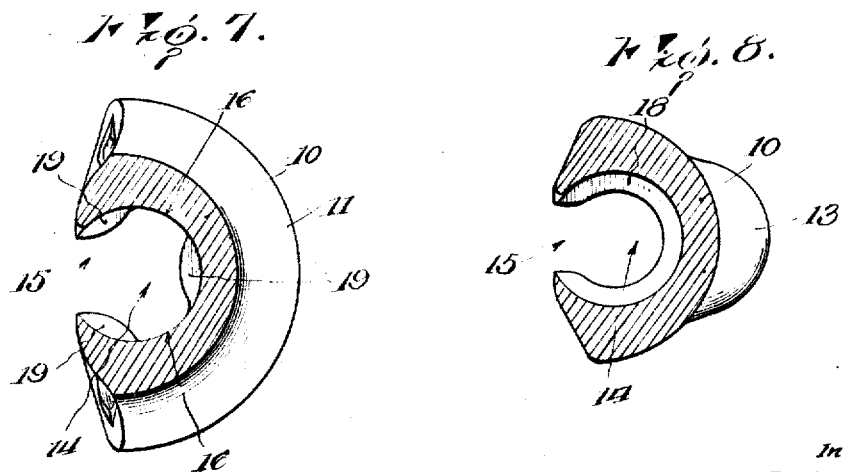

JOHN PETERSON, OF NORTH MANKATO, MINNESOTA.

STOVE-LEG AND CASTER.

1,353,784.  Specification of Letters Patent.  Patented Sept. 21, 1920.

Application filed September 24, 1919. Serial No. 325,831.

*To all whom it may concern:*

Be it known that I, JOHN PETERSON, a citizen of the United States, residing at North Mankato, in the county of Nicollet and State of Minnesota, have invented certain new and useful Improvements in Stove-Legs and Casters, of which the following is a specification.

This invention relates to an improved stove leg and caster and has as one of its principal objects to provide an arrangement wherein the caster may normally be disposed in retracted position within the leg so that the leg may rest directly upon the floor but wherein the caster may be readily extended for supporting the leg clear of the floor.

The invention has as a further object to provide an effective means for locking the caster in extended position and wherein said locking means will be so formed and mounted that when weight is brought to bear upon the caster, binding of the caster supporting post employed will not result.

A further object of the invention is to provide a construction wherein the locking means for the caster may readily be secured or locked in either active or inactive position.

And the invention has as a still further object to provide a construction wherein the caster and associated parts will be concealed within and behind the leg so that the leg will have the appearance of an ordinary stove leg.

Other and incidental objects will appear hereinafter. In the drawings:

Figure 1 is a rear elevation of my improved stove leg and caster,

Fig. 2 is a vertical sectional view taken centrally through the device,

Fig. 3 is a transverse section taken on the line 3—3 of Fig. 2 and looking in the direction of the arrows, this view showing the locking member for the caster moved to active position, Fig. 4 is a view similar to Fig. 3 but showing the locking member for the caster moved to inactive position, Fig. 5 is a transverse sectional view taken on the line 5—5 of Fig. 1 and looking in the direction of the arrows, Fig. 6 is a vertical sectional view taken at substantially right angles to Fig. 2, Fig. 7 is a transverse sectional view taken on the line 7—7 of Fig. 6 and looking in the direction of the arrows, the caster and associated parts being removed, and Fig. 8 is a view similar to Fig. 7 taken on the line 8—8 of Fig. 6 and looking in the direction of the arrows.

In carrying the invention into effect, I employ a stove leg which is formed with a shank 10 provided at its upper end with a hollow head 11 equipped with a suitable flange 12 or other approved means for connecting the leg to a stove. At the lower end of the shank is formed a base flange 13 for engagement with the floor. Formed in the shank of the leg is a vertical channel 14 having a restricted portion or neck 15 opening through the rear side of the shank. At its upper end portion this channel is enlarged by vertical grooves 16 opening through the upper end of the shank and equally spaced from the reduced portion 15 of the channel as well as from each other. At the lower ends of the grooves the rib between the grooves as well as the ribs lying between the grooves and the restricted portion 15 of the channel are undercut by arcuate slots 17 forming a continuous arcuate shoulder 18 at the lower sides of the slots as well as a plurality of spaced shoulders 19 at the lower ends of said ribs.

Slidable vertically within the channel 14 is a caster supporting post 20 snugly fitting the channel, this post being formed with a cylindrical portion lying within the cylindrical portion of the channel and having an extension provided with angular side walls engaging the side walls of the restricted portion of the channel while the outer face of the extension is flat to lie flush with the rear side of the shank 10 of the stove leg. The extension will thus hold the post against turning movement. For the sake of lightness, the post is preferably formed throughout the major portion of its length with an axial bore 21 opening through the lower end of the post and swiveled upon the post is a caster 22. Fixed to the caster yoke is a stem 23 extending through the bore 21 of the post and projecting through the upper end thereof. Countersunk in the lower end of the post to coact with the yoke of the caster is an anti-friction bearing 24 therefor. The caster may thus freely turn upon the post. Upon the upper end of the post is mounted a substantially triangular shaped locking member 25 having spaced angular portions or lugs 26 and, as will now be observed, the stem 23 of the caster extends through this locking member for rotatably supporting said member upon the post, the stem at its upper end being threaded to receive superposed nuts detachably connecting the caster as well as the locking member with the post. The lugs 26 of the locking member are adapted to slide vertically within the grooves 16 and the upper end portion of the restricted portion 15 of the channel. Mounted to rock upon the post 20 is a locking lever 27 for the locking member 25. Adjacent its lower end, this lever is formed with a vertical slot 28 through which is freely engaged a screw or other suitable fastening device 29 pivotally connecting the lever with the post to lie against the flat outer face of the post extension. Formed in the lever is an arcuate slot 30 at the ends of which are provided vertical notches 31 opening into the slot and freely received through the slot is a headed locking stud 32 carried by the post. At its upper end the lever is formed with a suitable thumb piece 33 and engaging through a suitable slot in the lever beneath this thumb piece is an obliquely directed lug 34 projecting from the rearmost of the lugs 26 of the locking member. The lever is thus pivotally connected with said member.

As will now be observed, by shifting the post 20 downwardly within the channel 14, the caster may be projected to active position extending below the base flange 13 of the stove leg when the lugs 26 of the locking member 25 will strike the shoulder 18 for limiting the post in its downward movement. By grasping the thumb piece 33 of the lever 27, the lever may then be rocked upon its pivot for rotating the locking member 25 and shifting the lugs 26 of said member within the slots 17 to engage beneath the shoulders 19. The locking member will then coact with said shoulders for supporting the post against upward movement so that the caster may support the weight upon the leg. When the locking member is thus shifted to active position, the locking stud 32 will be disposed to engage within that one of the notches 31 at the adjacent end of the slot 30 of the lever so that by shifting the lever upon its pivot, the lever may be moved to the position shown in Fig. 1 when the lever will be locked against pivotal movement to in turn lock the locking member 25 in its active position. Accordingly, accidental release of the supporting post will be prevented. In this connection it is to be particularly noted that the lugs 26 will, in the active position of the locking member support the post against upward movement at equally spaced points about the axis of the post. Consequently, the post will be prevented from binding within the channel 14 while undue strain upon any one of the lugs of the locking member will be eliminated. For retracting the caster it is simply necessary to raise the lever 27 and swing the lever to its extreme position opposite to that illustrated in Fig. 1, when the lever may, as will be clear, be again locked against pivotal movement for locking the locking member 25 in inactive position. Swinging of the lever 27, as just indicated, will result in rotation of the locking member until, as shown in Fig. 4, the lugs 26 clear the shoulders 19 and are received within the grooves 16 and reduced portion 15 of the channel 14. The caster supporting post may then freely move upwardly within said channel to permit the lowering of the stove leg into engagement with the floor. It will accordingly be seen that I provide a particularly effective construction for the purpose set forth while, at the same time, the caster and associated parts are so mounted upon the stove leg that, in use, the leg will not present any unusual appearance.

Having thus described the invention what is claimed as new is:

1. A device of the character described including a shank, a post slidable thereon, a caster carried by the post, the post being shiftable for projecting the caster, and means carried by the post to shift therewith but independently movable at substantially right angles to the post to coact with the shank for locking the post against retraction.

2. A device of the character described including a shank, a post slidable thereon, a caster carried by the post, a locking member carried by the post to shift therewith and movable to active position for sustaining the post against retraction or to inactive position for permitting retraction of the post, and means for locking said member in inactive position.

3. A device of the character described including a shank provided with a channel therein having a groove in its wall, the shank being provided with a shoulder at the lower end of said groove, a post slidable within the channel, a caster carried by the post, the post being shiftable for projecting the caster, and a locking member rotatable upon the post and adapted to be freely received in said channel and groove whereby the post may be retracted, the locking member being movable to engage beneath said shoulder for locking the post against retraction.

4. A device of the character described including a shank having a channel therein enlarged at its upper end portion by a groove, the wall of the channel being undercut at the lower end of said groove to provide confronting shoulders, a post slidable within the channel, a caster carried by the post, the post being shiftable for projecting the caster, and a locking member rotatable upon the post to be freely received in said channel and provided with a projection adapted to be freely received in said groove whereby the post may be retracted, the projection of the locking member overhanging the lowermost of said shoulders whereby to limit the post in its outward shifting movement and said member being shiftable to dispose the projection thereon engaging beneath the uppermost of said shoulders for locking the post against retraction.

5. A device of the character described including a shank, a post slidable thereon, a caster carried by the post, the post being movable for projecting the caster, a locking member rotatable upon the post to active position coacting with the shank for supporting the post against retraction, a lever pivoted upon the post and connected with said member for rotating the member, and means carried by the post to coact with the lever for locking the lever against movement.

6. A device of the character described including a shank having a shoulder, a post slidable upon the shank, a caster carried by the post, the post being shiftable for projecting the caster, and a horizontally disposed locking member shiftable with the post but rotatable thereon to coact with said shoulder for locking the post against retraction.

7. A device of the character described including a shank, a post slidable thereon, a caster carried by the post, the post being shiftable for projecting the caster, a locking member shiftable to coact between the post and shank for sustaining the post against retraction, a lever pivoted upon the post and connected with said member for shifting the member, the lever being provided with a slot, and a locking stud carried by the post to coact with portions of the walls of said slot for locking the lever against movement.

In testimony whereof I affix my signature.

JOHN PETERSON. [L. S.]